(12) United States Patent
Watvedt

(10) Patent No.: US 6,755,879 B2
(45) Date of Patent: Jun. 29, 2004

(54) BAG FILTER DEVICE

(76) Inventor: Jorn Watvedt, Stryker, Degernes (NO), N-1892

( * ) Notice: Subject to any disclaimer, the term of this patent is extended or adjusted under 35 U.S.C. 154(b) by 3 days.

(21) Appl. No.: 10/169,643

(22) PCT Filed: Jul. 12, 2001

(86) PCT No.: PCT/NO01/00003

§ 371 (c)(1),
(2), (4) Date: Jul. 3, 2002

(87) PCT Pub. No.: WO01/49392

PCT Pub. Date: Jul. 12, 2001

(65) Prior Publication Data

US 2003/0009998 A1 Jan. 16, 2003

(30) Foreign Application Priority Data

Jan. 7, 2000 (NO) .......................................... 20000088

(51) Int. Cl.[7] .............................................. B01D 46/02
(52) U.S. Cl. ............................. 55/323; 55/486; 55/494; 55/DIG. 36; 454/49; 454/366; 126/299 E; 126/299 D; 126/299 R
(58) Field of Search .......................... 55/323, 486, 494, 55/DIG. 36; 126/299 E, 299 D, 299 R; 454/49, 366

(56) References Cited

U.S. PATENT DOCUMENTS 3,260,189 A * 7/1966 Jensen .................... 55/DIG. 36
3,654,748 A * 4/1972 Bloom ........................ 55/337
4,283,209 A * 8/1981 Schmalhofer ........... 55/DIG. 36
4,350,504 A * 9/1982 Diachuk ................. 55/DIG. 36
4,854,953 A   8/1989 Van Weerden et al.
5,096,473 A * 3/1992 Sassa et al. .................... 55/486
5,156,661 A   10/1992 Adiletta
5,456,244 A * 10/1995 Prasser ................... 55/DIG. 36
5,567,216 A * 10/1996 Mirza et al. ............ 55/DIG. 36
5,755,214 A * 5/1998 Lai ........................ 55/DIG. 36
5,998,022 A   12/1999 Tamaru et al.
6,468,323 B1 * 10/2002 Chwala ................. 55/DIG. 36

FOREIGN PATENT DOCUMENTS

EP          273532       11/1992
WO          01/03808     1/2001

* cited by examiner

Primary Examiner—Minh-Chau T. Pham
(74) Attorney, Agent, or Firm—Andrus, Sceales, Starke & Sawall, LLP

(57) ABSTRACT

The invention relates to a bag filter device (12), which device enables collection and draining of particles of liquid from a gas, normally air, flowing through the bag filter (12). Such a bag filter (12) is normally used to trap solid particles from a gas flow, but where particles of liquid, in which there are for example salts or bacteria, are also trapped and possibly permeate the bag filter (12) and drip out on the downstream side thereof. Then the liquid may be carried further in the gas flow and have disadvantageous effect on equipment and surroundings. According to the invention such drawbacks can be avoided or reduced in that the filter material of a lower portion (18) and a bottom portion (19) in the continuation of the lower portion (18) of the bag filter (12) is formed in its entirety or in an outer filter layer (20) by a liquid-tight material. Possibly, the bottom portion (19) is provided with a liquid outlet (39), so that the liquid separated can collect and be drained from the bag filter (12).

10 Claims, 4 Drawing Sheets

BAG FILTER DEVICE

CROSS REFERENCE TO RELATED APPLICATION

Figure 1:
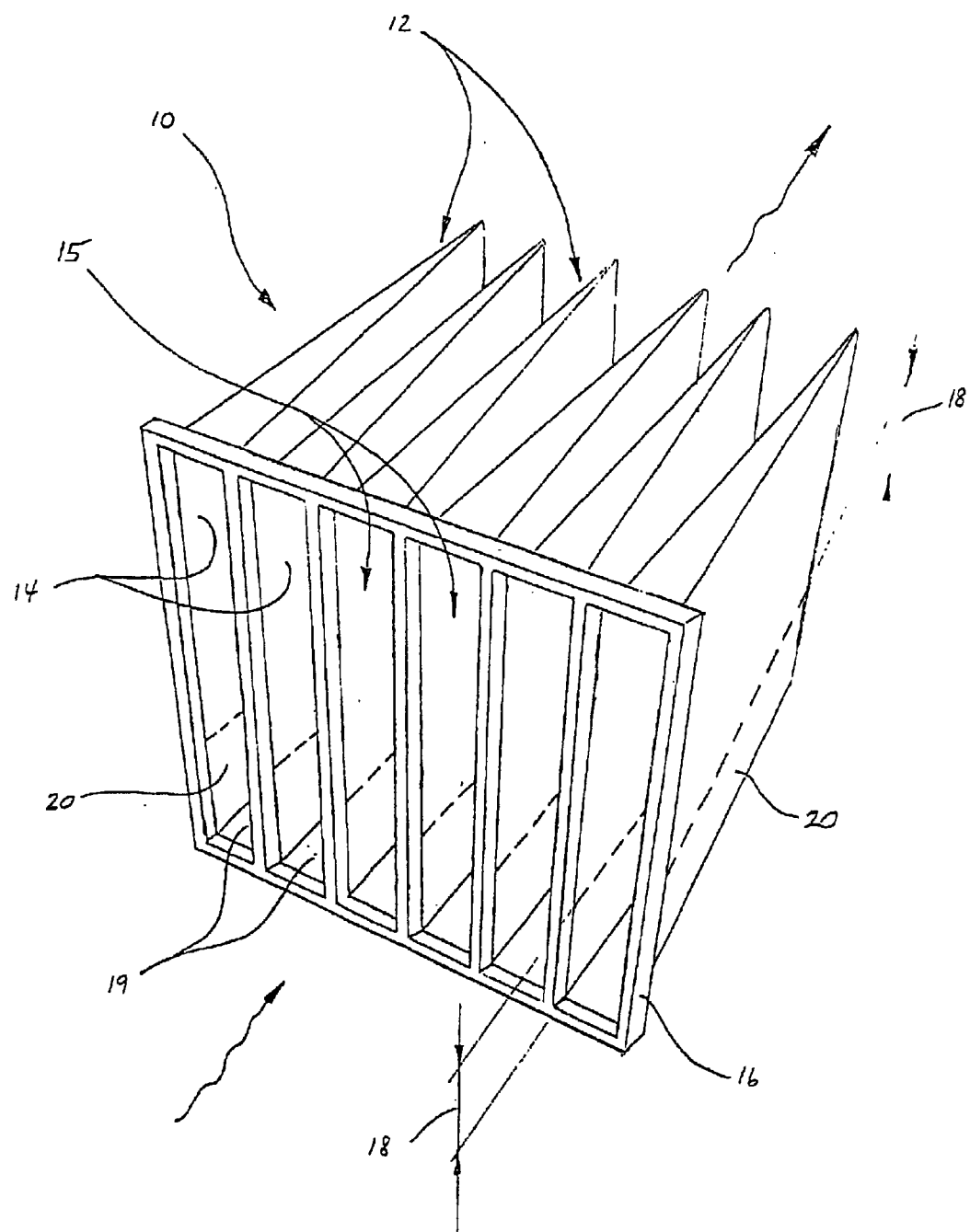

The present application is the U.S. national stage application of International Application PCT/NO01/00003, filed Jan. 3, 2001, which international application was published on Jul. 12, 2001 as International Publication WO 01/49392. The International Application claims priority of Norwegian Patent Application 20000088, filed Jan. 7, 2000.

FIELD OF THE INVENTION

The invention relates to a bag filter device, which allows collection and draining of particles of liquid from a gas flowing through the bag filter. Such a bag filter is used to separate preferably solid particles, e.g. dust, sand or pollen from a gas flow, the bag filter being used, for example, in a ventilation plant, combustion engine or in connection with industrial filtration of gasses.

BACKGROUND OF THE INVENTION

A bag filter is normally formed of several suitably joined filter pockets formed of a suitable filter material. The joined filter pockets are normally secured to a common frame and thereby form a usable filter. The number of filter pockets in the filter is normally decided on the basis of the area of use of the filter and of the flow rate of the gasses through the filter.

Otherwise the invention relates to the problems which may arise as a consequence of the filter absorbing and being wetted with liquid from a gas flowing through the filter.

KNOWN TECHNIQUE

Bag filters for separating preferably solid particles from a gas flow, are used either alone or in combination with other filters or devices, for example a droplet separator or a cyclone separator. Such a bag filter may be formed of fibre glass material or synthetic material, the filter material being woven or non-woven. For air purification bag filters of non-woven synthetic material are preferred.

A bag filter may consist of one or more materials. The bag filter may be constructed in layers, each layer being formed of a homogeneous material of distinct properties, the desired properties of the bag filter being made up of the properties of the layer materials together. Alternatively, the bag filter may have a progressive structure, in which the properties of the bag filter change gradually and suitably through the filter wall, for example in that the filter material is formed with gradually decreasing pore sizes in the downstream direction of a gas flow, so that the bag filter becomes gradually tighter and can trap particles of gradually smaller sizes.

In air purification such a bag filter is normally positioned in or near an air inlet, the bag filter in many cases being placed immediately after a device, for example a droplet separator, which is to separate water which is drawn into the air inlet together with the air. Such water is formed from rain water, mist or sea spray, for example. In an arrangement consisting of a droplet separator and a downstream bag filter, most of the water will be separated from the air in the droplet separator, whereas a minor portion of the water will follow the air flow further into the bag filter. Without a droplet separator the bag filter will receive a comparatively larger amount of water than in that case where a droplet separator is used under corresponding conditions. In both cases the bag filter receives air, which contains water particles in the form of droplets of varying droplet sizes. In a manner corresponding to that in which the bag filter traps solid particles of a certain size, it could trap water droplets of a certain size. This causes the bag filter to be wetted by water, possibly another liquid which might be present in the gas flow, and the whole or parts of the bag filter possibly to become saturated with water and/or other liquid present.

In heavy fog, for example, the atmospheric air will contain large amounts of water in the form of minute water droplets of a size of 30 micrometers or smaller, and these water droplets are separated only partially in a droplet separator. Thereby a large amount of the droplets are carried further into a downstream bag filter, in which bag filter a large amount of the droplets of a size above 1 micrometer are adsorbed or stopped, and in which the degree of wetting depends on the filter type and its configuration. Water trapped in the bag filter may gradually permeate the bag filter and exit on the downstream clean side of the bag filter, after which some of the water in the form of water droplets may be caught by the air flow and carried further therein. A common method of preventing such water droplets in an air flow from being carried further into, for example, a ventilation plant in a building, is to position a droplet separator immediately downstream of the bag filter, in which case two droplet separators and an intermediate bag filter are used.

Bag filters for use in gas flows other than air flows, possibly in combination with one or more droplet separators and/or other equipment for treating a flowing gas, may be wetted in a corresponding manner by liquids present in the gas flow, after which the liquid or liquids may possibly permeate the bag filter and be carried further downstream in the gas flow.

DRAWBACKS OF KNOWN TECHNIQUE

There are several drawbacks to such bag filters, and where such a bag filter is possibly used alone or in combination with, for example, one or more droplet separators and/or other equipment for treating a flowing gas.

As a consequence of gravity, water or liquid particles adsorbed or trapped in a sufficient amount in such a bag filter, will be pulled down towards a lower filter portion and finally through a bottom portion of the bag filter. The liquid could then drip out downstream from the clean side of the bag filter and possibly be caught again by the flowing gas. Additionally, the flowing gas could possibly contain droplets of liquid of such a small size that they will not be trapped in the bag filter. Relatively large drops dripping out from the bag filter may be caught and drained out in a possible downstream droplet separator. However, many of these droplets and the droplets passing unobstructed through the bag filter are very small, normally of a size smaller than 30 micrometers. These droplets are caught only in part by a downstream droplet separator, whereas the remaining droplets are carried further in the gas flow.

In a ventilation plant, for example, this may have undesired effects, as water droplets that permeate the bag filter are often saturated with salt, possibly they contain bacteria or other contaminants, and these substances are thereby carried further in the ventilation plant, possibly affecting adversely the surroundings that the air makes contact with. Such contaminants may possibly settle at one or more points in the ventilation plant, for example in a downstream droplet separator or in a drip zone below or round the bag filter. By possible subsequent drying, such deposits may be torn loose and carried further by the air flow. Alternatively, such deposits may in time accumulate and possibly cause equipment and parts of the ventilation system located downstream of the bag filter to become blocked or work less efficiently.

Water droplets permeating the lower portion and bottom portion of a bag filter and dripping out of the bag filter, may often be too big to be carried along by the air flow through the bag filter, or the water droplets may be in an area around the bag filter with less air flow, so that the water droplets drip down onto a bed and are possibly drained away. Lack of draining possibilities, possibly insufficient draining, may lead to damage by damp or rot in the ventilation plant or otherwise in the surroundings.

Droplets of liquid dripping out from a bag filter are often removed in a droplet separator or similar device placed downstream and in the proximity of said bag filter. In those cases where such an arrangement is necessary in order to bring about a desired treatment of a flowing gas, the installation costs increase, as such an arrangement demands more equipment and space than a plant in which the bag filter constitutes the last stage in the gas treating process. Additionally, a droplet separator or similar device located downstream of said bag filter will make the overall pressure fall in the gas flow of the plant increase, which increases the continuous operating costs of the plant compared to a plant in which the bag filter constitutes the last step in the gas treating process.

OBJECT OF THE INVENTION

The object of the present invention is to provide a bag filter with a device which allows the collection and draining of particles of liquid from a gas flowing through the bag filter, so that the liquid particles are prevented from permeating and dripping out from the downstream clean side of the bag filter. Thereby the above-mentioned drawbacks are prevented or reduced.

REALISATION OF THE OBJECT

As appears from the characterising part of the present independent claim, the object is realised in that, in a portion of the bag filter as a whole or in an outer filter layer, the filter material is formed of a liquid-tight material. When the bag filter is in use, this portion is formed by a lower portion which has, in its continuation, a bottom portion of the same bag filter arranged thereto, so that, due to gravity, separated liquid from a gas flowing through the bag filter will finally accumulate in this bottom portion, and may possibly be drained through the bottom portion. The bottom portion of the bag filter is possibly formed or provided with a liquid outlet, preferably at a lowermost position. Liquid accumulated in the bag filter may for example be drained through a drain pipe or a similar draining device. Alternatively, the liquid may be drained through the bottom portion and out through the open gas inlet of the bag filter, the liquid running counter to the flow of the gas through the bag filter due to gravity, and the liquid being in an area round the bag filter with normally little gas flow. The bag filter is preferably formed from synthetic and non-woven material.

The collection of, for example, water in the bag filter, may be made more efficient in that the entire filter material, or parts thereof, is/are made water-repellent, terminologically called hydrophobic. This may be achieved by means of suitable chemical treatment of the filter material, the pore walls of the filter material in this way being impregnated and made hydrophobic. This causes surface tensions between water particles and the pore walls of the filter material to be reduced, water particles to adhere to the pore walls to a smaller degree and thereby separate more easily from the filter material, more water particles to unite more easily with larger water drops, larger water drops more easily being pulled downwards, as a consequence of gravity, gathering in the lower portion and bottom portion of the bag filter.

In a layered bag filter it will be the most suitable, in the collection of, for example, water from air flowing through a filter, that the last downstream filter layer has been made hydrophobic, whereas in a bag filter of progressive structure it will be the most suitable that a downstream filter portion has been made hydrophobic. Thereby most of the water can be adsorbed in the upstream filter layers or filter portions, whereas downstream filter layers or filter portions prevent water from permeating, the filter layers or filter portions, however, allowing at the same time air to pass through the bag filter.

When such liquid-repellent bag filters are being used on other gasses than air, and when the separated liquid, possibly liquids, are different from water, all or parts of the filter material must have been made liquid-repellent to the liquid or liquids that will contact such a bag filter. This may for example be achieved through suitable chemical treatment of the filter material, which will, in use, result in a more efficient separation of liquid in the bag filter.

ADVANTAGES OF THE INVENTION

The invention has the effect that the particles of liquid, which are present in a gas flow and are trapped and concentrated in the bag filter, may gather in the lower portion and bottom portion of the bag filter, without, at the same time, flowing through the bag filter and dripping out from the clean side of the bag filter, and that liquid can efficiently be drained from the bottom portion of the bag filter, for example through drain pipes or drain ducts, so that droplets of liquid do not cause the above-mentioned drawbacks in equipment and surroundings.

BRIEF DESCRIPTION OF THE FIGURES IN THE DRAWINGS

Figure 2:
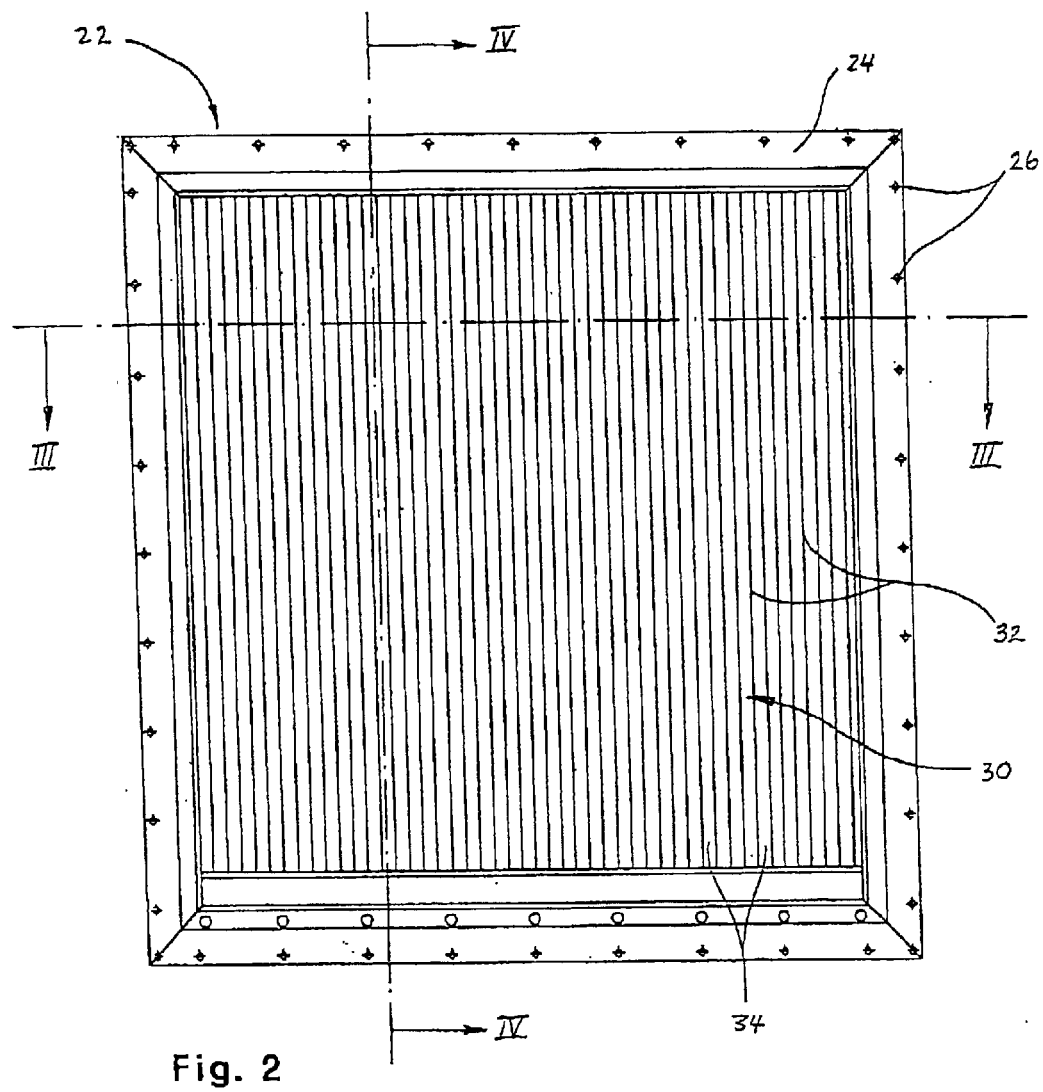
Figure 3:
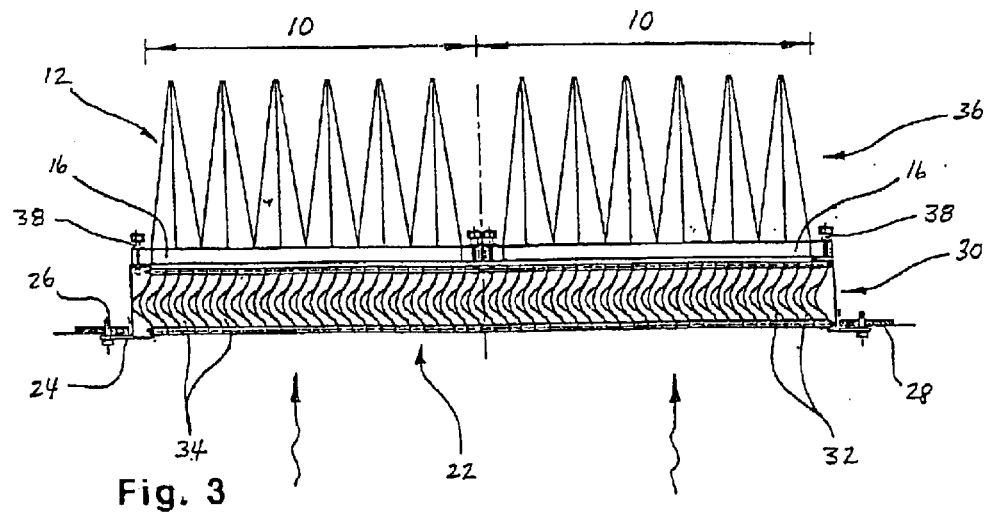
Figure 4:
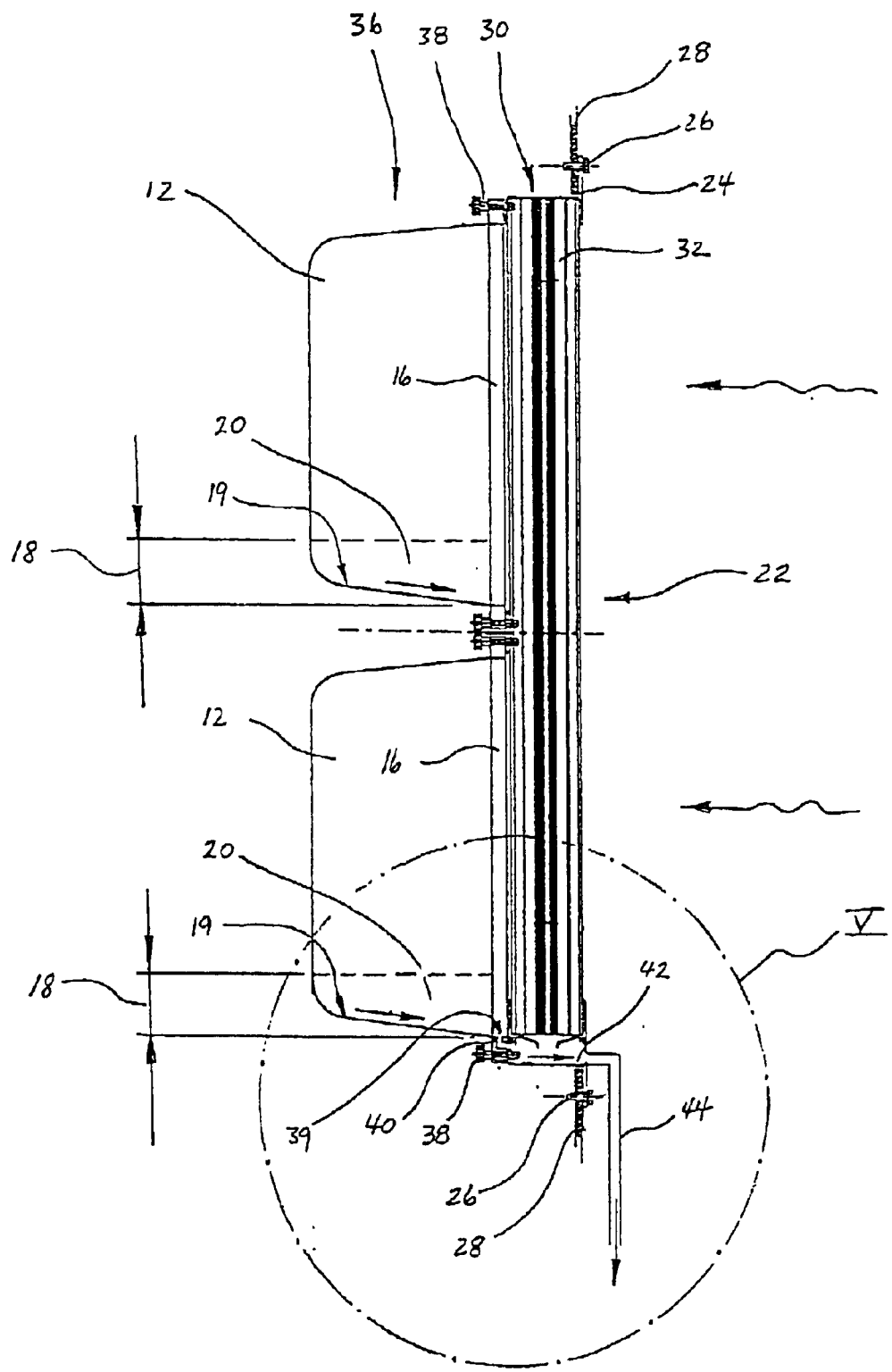
Figure 5:
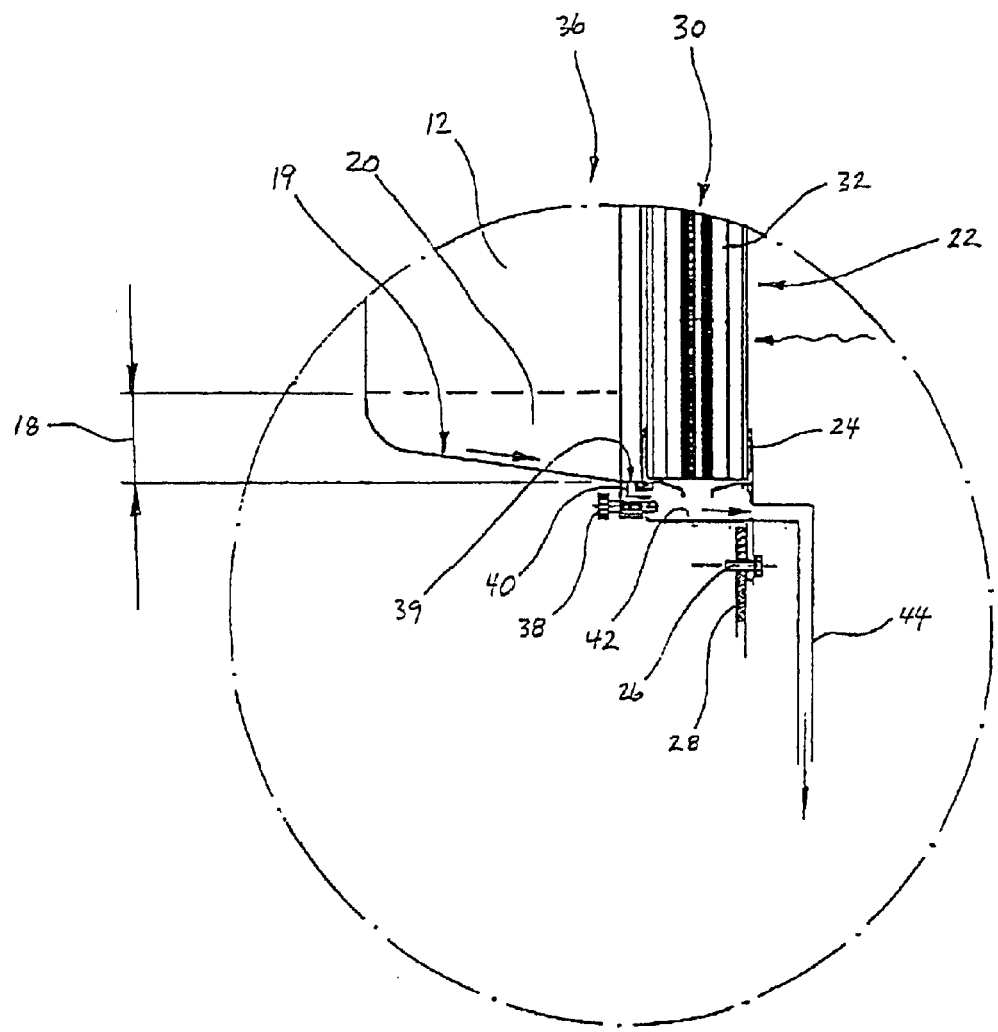

In the following part of the description, and with reference to the FIGS. 1–5, a non-limiting exemplary embodiment of the invention will be shown, one specific reference numeral referring to the same detail in all the drawings, in which this detail is identified, FIG. 1 showing a perspective view of a bag filter, the exemplary bag filter being formed by six filter pockets having a rectangular frame arranged thereto, a lower portion of the bag filter identified in the drawing between opposite arrows, and a bottom portion of the bag filter being provided with an outer filter layer, which is formed by a watertight material;

FIG. 2 showing a view of a vertical air treatment plant, seen from the upstream side of the plant, said plant being formed, in the downstream direction, by a droplet separator and a consecutive filter arrangement, a section line III—III, cf. FIG. 3, and a section line IV—IV, cf. FIG. 4, being indicated in the drawing;

FIG. 3 showing a horizontal section of the air treatment plant, seen along the section line III—III, cf. FIG. 2;

FIG. 4 showing a vertical section through the air treatment plant, seen along the section line IV—IV, cf. FIG. 2, in which two out of a total of four bag filters are shown, and in which the lower portion of each bag filter, indicated in the drawing between opposite arrows, and a bottom portion in the continuation of the lower portion are provided with an outer filter layer, formed of a watertight material, the bottom portion of the lower bag filter being formed with a liquid outlet in its lowermost position, through which water may be drained, the upper bag filters in the filter arrangement, however, also being provided with corresponding liquid outlets, not shown in the drawing, the drawing otherwise showing a section circle V, cf. FIG. 5; and FIG. 5 showing an enlarged vertical section as indicated by the section circle v in FIG. 4, the drawing, however, showing only one of the bag filters of the air treatment plant.

DESCRIPTION OF AN EXEMPLARY EMBODIMENT OF THE INVENTION

Equipment and/or arrangement that does/do not directly concern the invention itself, but is/are otherwise assumed to be necessary suppositions in a ventilation plant, for example, will not be specified or described in further detail in the following exemplary embodiment. In a ventilation plant, such equipment may comprise, for example, ducts, pipes, valves and dampers, connectors, air outlets and control systems.

The exemplary embodiment deals with an air filter 10 in the form of a bag filter 12 made up of six joined filter pockets 14, each with an inlet 15 for air, with a rectangular frame 16 arranged thereto, the filter material in a lower portion 18, in FIG. 1 identified between opposite arrows, and in a bottom portion 19 arranged as a continuation of the lower portion 18, being provided with an outer filter layer 20, which is formed of a watertight material. FIG. 1 also indicates, by wavy arrows, a direction of flow for air flowing through the bag filter 12.

FIG. 2 shows an air treatment plant 22 seen from the upstream side. The plant 22 has a frame 24 arranged thereto, the frame 24 being provided with holes 26 evenly spaced apart, for the securing of the frame 24 and the air treatment plant 22 to a surrounding wall 28 or similar.

FIG. 3 shows a horizontal section through the same air treatment plant 22 as that indicated in FIG. 2, wavy arrows in the drawing indicating the direction of flow of the air. The first step of air treatment in the plant 22 is carried out in a droplet separator 30. The droplet separator 30 consists of a number of vertical profiled separating elements 32 equally spaced apart, so that between two separating elements 32 there is formed a flow duct 34, the droplet separator 30 consisting of several such flow ducts 34. Such a droplet separator 30 is described moreover in NO 302337. Without any further description of the function of the droplet separator 30, most droplets of a certain size passing through the droplet separator 30 will be separated from the air flow and may then be drained. The air with possible solid particles and smaller water droplets moves on to the second air treatment step in the plant 22. This air treatment step is formed by a filter arrangement 36 consisting of four air filters 10 mounted parallel to each other, only two of the four air filters 10 being indicated in FIG. 3. Each filter frame 16 is placed immediately after the droplet separator 30, the indicated filter frames 16 being secured by means of screws 38, for example.

FIG. 4 shows a vertical section through the same air treatment plan 22 as that indicated in FIGS. 2 and 3; wavy arrows in the drawing indicating the flowing direction of the air. The air flows through the droplet separator 30 into the filter arrangement 36 located immediately behind it, where most of the solid particles and remaining water droplets of a certain size are caught. This makes water concentrate in each bag filter 12 of the arrangement 36, and water be pulled, due to gravity, towards a lower portion 18 and a bottom portion 19 in the continuation of the lower portion 18, two out of a total of four such lower portions 18 being indicated in FIG. 4 between opposite arrows. In each bag filter 12 the lower portion 18 and the bottom portion 19 according to the invention are provided with an outer filter layer 20 formed of a watertight material. In a lowermost position in the bottom portion 19 each bag filter 12 is provided with a liquid outlet 39, to which there are then arranged a drain pipe 40, a common drain duct 42 following at the bottom of the air treatment plant 22, and then an outlet pipe 44, through which the water is drained. Water drawn down through each bag filter 12 will thereby be collected and drained from the bottom portion 19 instead of permeating and dripping out of the clean side of each bag filter 12. In FIGS. 4 and 5 such a draining device is shown simplified for one of the lower bag filters 12.

FIG. 5 shows an enlarged section V of FIG. 4, the details identified in FIG. 5 moreover being identical to details identified in FIG. 4. The draining direction of the water after collection in the bottom portion 19 is visualised in FIGS. 4 and 5 by arrows pointing in the flow direction of the water.

In practice, sizes and configurations of the lower portions 18, bottom portions 19 and the outer filter layers 20 must be adapted for the air treatment plant 22 in question, the drawings only indicating a non-limiting example of such a configuration.

What is claimed is:

1. A device for a bag filter to be used for collecting solid particles from a gas flowing through the bag filter, the bag filter also adsorbing or trapping liquid particles entrained in said gas flow by concentrating and gathering, due to gravity, said liquid particles in a lower portion of the bag filter having a bottom portion continuously arranged thereto, wherein the bag filter material of said lower portion and said bottom portion is formed, in its entirety, or in an outer layer thereof, of liquid-tight material.

2. A device according to claim 1, wherein said bottom portion is formed or provided with a liquid outlet.

3. A device according to claim 2, wherein said liquid outlet is placed in a lowermost position of said bottom portion.

4. A device according to claim 2, wherein said liquid outlet consists of a bottom portion of an open gas inlet of the bag filter.

5. A device according to claim 2, wherein said liquid outlet connected to a draining device.

6. A device according to claim 1, wherein the bag filter is formed of a synthetic material.

7. A device according to claim 1, wherein the bag filter is formed of a non-woven material.

8. A device according to claim 1, wherein said bag filter material, in all or parts thereof, is liquid-repellent towards said liquid particles entrained in said gas flow.

9. A device according to claim 8, wherein said bag filter material is water-repellent in a downstream layer or portion of the bag filter.

10. A device according to claim 5, wherein said draining device is selected from the group consisting of a drain pipe, a drain duct and an outlet pipe.

* * * * *